3,063,780
TETRA-AZA PORPHINE DYESTUFFS

Georg Rösch, Leverkusen, and Helmut Klappert and Karl-Heinz Gehringer, Koln-Stammheim, Germany, assignors to Farbenfabriken Bayer Aktiengesellschaft, Leverkusen, Germany, a corporation of Germany
No Drawing. Filed Nov. 26, 1958, Ser. No. 776,453
Claims priority, application Germany Dec. 2, 1957
10 Claims. (Cl. 8—1)

This invention relates to tetra-aza-porphine dyestuffs.

It has been found that water-soluble dyestuffs are obtainable by reacting water-insoluble tetra-azaporphines containing aromatic groupings with tertiary amino groups, with ω-halo-N-methylimides of dicarboxylic acids in the presence of organic acids.

Tetra-aza-porphines which are suitable for the process according to the invention are for example phthalocyanines or other tetra-aza-porphines containing aromatic radicals. The tertiary amino group may be linked with the aromatic radical via bridge members such as an alkylene group or groups which may also contain hetero atoms such as $SO_2$, NH—CO, or CO groups and these bridge members may carry further substituents. The tertiary amino group may contain, for example, alkyl or substituted alkyl groups such as hydroxy alkyl groups as substituents. Moreover, the tertiary amino group may also be a constituent of a ring system. Examples of such groupings in which the tertiary amino group is linked with an aromatic grouping or radical of a tetra-aza-porphine via bridge members are the following:

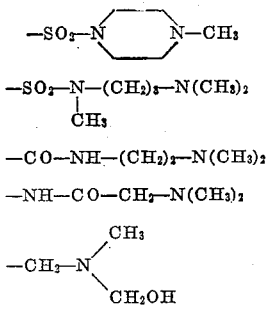

An aromatic radical may also be substituted by several groupings of this type. The water-insoluble tetra-aza-porphines may also contain the tertiary amino group directly in the aromatic radical, as is the case with Bz-aza-phthalocyanines.

The manufacture of the water-insoluble tetra-aza-porphines may be carried out by methods known as such or by analogous processes, for example according to the process of German patent specification No. 696,590 and British patent specifications Nos. 717,137 and 724,212.

Apart from metal-free water-insoluble tetra-aza-porphines compounds containing heavy metals, for example, copper, nickel or cobalt, are also suitable. The tetra-aza-porphines should, in general, contain at least 3 tertiary amino groups.

As ω-halo-N-methylimides of dicarboxylic acids there may be mentioned for example ω-chloromethyl phthalimide, ω-chloromethyl-glutaric acid imide, ω-chloromethyl-maleic acid imide, ω-chloromethyl-adipic acid imide and ω-chloromethyl succinic acid imide or the corresponding bromine compounds.

When carrying out the process according to the invention, it is, in general, necessary to use 2 mols of ω-N-methylimide per mol of tetra-aza-porphine, in order to obtain readily water-soluble products. If more than 2 mols of ω-N-methylimide are used per mol of tetra-aza-porphine for example 4 mols of ω-halo-N-methylimide the dyestuffs thus obtained possess properties similar to those obtainable with the use of 2 mols of ω-halo-N-methylimide. The reaction may be carried out within a wide range of temperature, for example between 0 and 100° C., the reaction proceeding, of course, more rapidly at somewhat higher temperatures. As organic acids there are expediently used those having a good dissolving power for tetra-aza-porphines. Formic acid is especially suitable, but other acids such as succinic acid, malonic acid, itaconic acid or mixtures of these acids with acetic acid may also be used.

The water-soluble dyestuffs obtainable by the process according to the invention may be obtained from the reaction solutions in usual manner, for example by the addition of acetone or ether. They are however also obtainable by distilling off the organic acids used as solvents to a great extent and then, after the addition of water, separating out the dyestuffs from their blue solutions by the addition of sodium chloride.

From the water-soluble dyestuffs there may again be obtained water-insoluble dyestuffs by a heat treatment. Although this transformation of the dyestuffs can be achieved by heat treatment alone, it is expedient in many cases to work in the presence of alkalies, since in this case the formation of water-insoluble tetra-aza-porphines proceeds more rapidly. Suitable alkalies are for example alkali metal hydroxides, alkali metal carbonates, alkali metal bicarbonates, alkali metal acetates or ammonia.

The process according to the invention is especially suitable for producing dyeings or prints on textiles with water-insoluble tetra-aza-porphines. These dyestuffs are particularly suitable for the dyeing and printing of materials of cellulose or regenerated cellulose. The dyeings and prints may be effected according to usual methods by leaving the dyeing materials at temperatures in the range of, for example, 20–100° C., for some time in aqueous dyebaths containing the water-soluble tetra-aza-porphine dyestuffs. The dyestuffs then draw onto the dyeing materials and are transformed into the water-insoluble tetra-aza-porphine dyestuffs at elevated temperatures. However, the dyeing materials may also be impregnated with the aqueous dyestuff solutions, for example on the foulard. The dyestuff formation may then be carried out in usual manner, for example by heat treatment such as steaming.

The dyebaths and printing pastes may contain the usual auxiliaries such as dyestuff dispersing agents, levelling agents or wetting agents provided these additives do not show a strongly alkaline reaction in an aqueous solution. It is expedient to use neutral to weakly acid dyebaths and printing pastes for the dyeings and prints. The dyeings and prints thus obtained are expediently subjected to an alkaline treatment with dilute aqueous alkalies. Subsequently, the usual after-treatments are advantageously effected, for example by treating the dyeings and prints in boiling soap baths. The dyeings from dyebaths may also be varied so that the requisite alkalies are added to the dyebaths directly after completion of the dyeing, or by carrying out the alkaline fixation together with the after-treatment with soap.

If fabrics or fibre materials of silk or polyacrylonitrile or co-polymers consisting essentially of polyacrylonitrile are to be dyed, weakly acid dyebaths are advantageously used.

The water-insoluble dyestuffs obtainable according to the process of the invention largely correspond with regard to their properties to the water-insoluble tetra-aza-porphines used for the manufacture of water-soluble tetra-aza-porphines. Consequently, the dyestuffs, dyeings and prints thus obtained possess very good fastness properties.

The following examples are given for the purpose of illustrating the invention.

Example 1

(a) 22 parts by weight of tetra-($\omega$-N-methyl-N-hydroxymethyl-aminomethyl)-copper phthalocyanine are dissolved in 100 parts by volume of approximately 90% commercial formic acid, 21 parts by weight of $\omega$-chloromethylphthalimide or the equivalent amount of $\omega$-bromomethylphthalimide are added and the reaction mixture is stirred at room temperature for 24 hours. The blue solution is stirred into 500 parts by volume of ether or acetone, the separated blue dyestuff filtered off with suction, washed with ether or acetone and dried. The yield is 27.5 parts by weight.

The analysis of the water-soluble dyestuff gives the following values:

$$C, 48.71\%$$
$$H, 5.35\%$$
$$O, 15.01\%$$
$$N, 15.08\%$$
$$Cl, 9.75\%$$
$$Cu, 6.10\%$$

This corresponds to the composition $$C_{44}H_{59}O_{10}N_{12}Cl_3Cu$$

The tetra-($\omega$-N-methyl-N-hydroxymethyl-aminomethyl)-copper phthalocyanine is obtainable in the following manner:

18.2 parts by weight of the tetra-($\omega$-amino-methyl)-copper phthalocyanine obtainable according to the process of British patent specification No. 717,137 are dissolved in 200 parts by weight of approximately 90% commercial formic acid. 25 parts by weight of a 30% formaldehyde solution are then added and the reaction mixture is stirred at 80–90° C. for 5 hours. The blue solution thus obtained is stirred into 1000 parts by volume of water and the alkylating product thus obtained is precipitated by the addition of 270 parts by volume of 43% sodium hydroxide solution. The blue precipitate is filtered off with suction, washed neutral with water and dried. The yield is 22 parts by weight.

The analysis gives the following values:

C, 61.94%; theoretically: C, 60.84%
H, 5.27%; theoretically: H, 5.07%
O, 6.90%; theoretically: O, 7.37%
N, 18.53%; theoretically: N, 19.35%
Cu, 7.36%; theoretically: Cu, 7.37%

Instead of the $\omega$-halo-phthalimide there may also be used equivalent amounts of $\omega$-chloromethyl-glutaric acid imide, -maleic acid imide, -succinic acid imide or -adipic acid imide.

Instead of formic acid, mixtures of formic acid and glacial acetic acid or of malonic acid and glacial acetic acid may also be used.

(b) 10 parts by weight of the water-soluble dyestuff are dissolved in 200 parts by weight of water and heated to the boil for 30 minutes. The blue insoluble dyestuff thus obtained is filtered off and washed. The same insoluble dyestuff is obtainable by carrying out the heating in the presence of 1 part by weight of sodium hydroxide, potassium carbonate, potassium acetate or potassium bicarbonate. In this case, the dyestuff formation is completed within a few minutes.

(c) 15 parts by weight of the dyestuff obtained according to (a) are dissolved in 1000 cc. of water. A cotton fabric is impregnated with this padding liquor and squeezed on the foulard. After drying at 60–70° C., a boiling treatment follows for 30 minutes in a bath containing 10 cc. of sodium hydroxide solution (38° Bé.) in 1000 cc. of water. After boiling with soap, the fabric is dyed in a turquoise blue shade which is fast to boiling.

(d) A cotton fabric is printed with a printing paste obtained in the following manner:

3 parts by weight of the dyestuff obtained according to (a) are dissolved in 20 parts by weight of water, 5 parts by weight of urea are added, the mixture is stirred into 50 parts by weight of wheat starch-tragacanth thickener and made up with 22 parts by weight of water to 100 parts by weight of printing paste. After the usual preliminary drying at 60° C., the dyestuff is fixed on the fibre by neutral or acid steaming in the Mather-Platt ager for 5–10 minutes. After the usual after-treatment, a clear blue print of very good fastness properties is obtained.

Example 2

16.1 parts by weight of tetra-($\omega$-N-dimethyl)-copper phthalocyanine ($1/100$ mol), obtainable according to the process of British patent specification No. 724,212, are dissolved in 100 parts by volume of approximately 90% commercial formic acid, 15.64 parts by weight of $\omega$-chloromethyl phthalimide ($8/100$ mol) or 11.80 parts by weight of $\omega$-chloromethylsuccinimide ($8/100$ mol) are added and the reaction mixture is stirred at room temperature for 24 hours. The blue solution is then stirred into 500 parts by volume of ether or acetone, the separated blue dyestuff is filtered off with suction, washed with ether or acetone and dried. The yield is 20 parts by weight.

If instead of tetra-($\omega$-N-dimethyl-aminomethyl)-copper phthalocyanine there is used the corresponding amount of the nickel or cobalt compound, similar water-soluble blue dyestuffs are obtained.

Instead of tetra-($\omega$-N-dimethyl-aminomethyl)-phthalocyanines there may also be used the corresponding $\omega$-N-diethyl-, -dipropyl- or -dibutyl-aminomethyl compounds. Dyestuffs of very similar properties are thus obtained.

Moreover there may also be used instead of tetra-($\omega$-N-dimethylaminomethyl)-copper phthalocyanine the corresponding octa-($\omega$-N-dimethylaminomethyl)-copper phthalocyanine.

Example 3

27 parts by weight of the green dyestuff containing 6 $\omega$-aminomethyl groups obtainable according to the process of British patent specification No. 717,137, Example 2, whose amino groups are dimethylated according to the process of British patent specification No. 724,212, are dissolved in 200 parts by volume of approximately 90% commercial formic acid, 26 parts by weight of $\omega$-chloromethyl-phthalimide or the corresponding amount of $\omega$-chloromethyl-succinimide or the corresponding bromine compounds are added and the reaction mixture is stirred at room temperature for 24 hours. The green solution is then stirred into 100 parts by volume of ether or acetone, the separated green dyestuff is filtered off with suction, washed with ether or acetone and dried. The yield is 35 parts by weight. The dyestuff dissolves in water with a green colour and shows the properties described in Example 1.

If instead of 27 parts by weight of the hexa-($\omega$-N-dimethylaminomethyl)-tetraphenyl-copper phthalocyanine, there are used 24.6 parts by weight of the tetra-($\omega$-N-dimethylamino-methyl)-tetraphenyl-copper phthalocyanine obtainable according to British patent specification No. 717,137, Example 4, and, instead of 26 parts by weight of $\omega$-chloromethyl-phthalimide, 17.3 parts by weight of $\omega$-chloromethyl-phthalimide, there is likewise obtained a green water-soluble dyestuff of similar properties.

(b) 3 parts by weight of one of the dyestuffs thus obtained are dissolved in 2000 cc. of water. 100 g. of cotton yarn are treated in this dyebath at a raising temperature for 30 minutes and at 90° C. for a further 30 minutes. After rinsing, the yarn is after-treated with a hot solution of 3 g./litre of sodium carbonate and soaped; it is then dyed in a green shade.

Prints on cotton, for example, are obtainable in a similar manner to that described in Example 1(d).

Example 4

(a) Into 100 parts by volume of approximately 90% commercial formic acid there are introduced with stirring at room temperature 12.88 parts by weight of the tetrasulphonamide obtainable from 1 mol of copper phthalocyanine-3,3′,3″,3‴-tetrasulphochloride and 4 mols of 1-N-dimethylamino-3-N-methylaminopropane, and 7.82 parts by weight of ω-chloromethyl phthalimide or the corresponding amount of ω-chloromethyl succinimide. After stirring at room temperature for 24 hours, the greenish blue solution is stirred into 500 parts by volume of ether or acetone and the separated greenish blue water-soluble dyestuff is filtered off with suction, washed with ether or acetone and dried. The yield is 15 parts by weight. The dyestuff shows the same properties as the dyestuff obtained according to Example 1.

If in the process described above there are used, instead of 7.82 parts by weight, only 3.91 parts by weight of ω-chloromethyl phthalimide, a water-soluble dyestuff of similar properties is obtained.

The tetrasulphonamide used is prepared as follows:

The copper phthalocyanine-3,3′,3″,3‴-tetrasulphochloride obtainable by known methods from 17.3 parts by weight (%₁₀₀ mol) of copper phthalocyanine and chlorosulphonic acid is stirred in a still moist state with 300 parts by volume of water. 30.6 parts by weight of 1-N-dimethylamino-3-N-methylaminopropane are then run into the mixture at 0° C. with stirring. After stirring at 0° C. for 24 hours, the reaction mixture is diluted with 500 parts by volume of water, brought to the boil after the addition of some sodium carbonate, the blue precipitate is filtered off with suction, washed with hot water, until the discharge is no longer blue, and dried. The yield is 35 parts by weight.

(b) 3 parts by weight of one of the dyestuffs thus obtained are dissolved in 2000 cc. of water. 100 g. of cotton yarn are treated in this dyebath at 90° C. for 30 minutes. After rinsing, the yarn is after-treated with a hot solution of 3 g./litre of sodium carbonate and soaped. The yarn is then dyed a fast blue shade.

Prints on cotton, for example, are obtainable in a corresponding manner to that described in Example 1(d).

Example 5

(a) Into 2000 parts by volume of approximately 90% commercial formic acid there are introduced with stirring 232 parts by weight of 3,3′,3″,3‴-tetra-aza-copper phthalocyanine (obtainable according to the process of German patent specification No. 696,590, Example 4, and 344 parts by weight of ω-chloro-N-methyl-phthalimide. After a few hours, a voluminous paste is formed which, after stirring for 24 hours at room temperature, completely dissolves with a blue colour. The reaction mixture is then stirred into 5000 parts by volume of ether or acetone, whereupon a bluish green precipitate is formed which is filtered off with suction, thoroughly washed with ether or acetone and dried. A bluish green powder is thus obtained which dissolves in water with a blue colour. Yield: 320 parts by weight.

The analysis of the water-soluble dyestuff gives the following values:

C, 43.63%
H, 3.40%
O, 12.38%
N, 20.50%
Cl, 11.35%
Cu, 8.20%

In the double bond range of the infra-red spectrum the dyestuff is very similar to copper phthalocyanine. Both compounds show at 1730 cm.$^{-1}$ a very strong double bond band presumably belonging to a >C=N double bond which is strengthened by complex formation. In the whole remaining part of the spectrum the structure of the starting compound, i.e. Bz-aza-copper phthalocyanine, is only slightly changed.

Instead of ω-halo-phthalimide there may also be used equivalent amounts of ω-chloromethyl-glutaric acid imide, -maleic acid imide, -succinic acid imide or -adipic acid imide.

Instead of formic acid, there may also be used mixtures of formic acid and glacial acetic acid or of malonic acid and glacial acetic acid.

(b) 10 parts by weight of the water-soluble dyestuff are dissolved in 250 parts by weight of water and heated to the boil for 30 minutes. The blue insoluble dyestuff thus obtained is filtered off and washed. The analysis of the dyestuff gives the following values:

C, 52.68%
H, 3.04%
O, 7.52%
N, 26.61%
Cu, 10.16%

The same water-insoluble dyestuff is obtainable by carrying out the heating in the presence of 1 part by weight of sodium hydroxide, potassium carbonate, potassium acetate or potassium bicarbonate. In this case, the dyestuff formation is completed within a few minutes.

(c) 3 parts by weight of the water-soluble dyestuff are dissolved in 2000 parts of water at 50° C. 100 parts by weight of cotton skein yarn are treated in this dyebath at a raising temperature for 30 minutes and at 90–100° C. for a further 15 minutes. The dyebath is then practically completely exhausted. The yarn is then rinsed and after-treated with a solution of 5–10 parts by weight of sodium carbonate in 2000 parts by weight of water at 100° C. for 15 minutes. In order to remove the pigment adhering to the surface, the yarn is strongly after-soaped; it is then dyed a blue shade.

It is not necessary to use the dyestuff employed for dyeing in an isolated form, it is also possible to use directly the solution formed by the reaction of phthalocyanine with ω-chloro-N-methyl phthalimide.

In order to obviate an excess of formic acid, there is introduced in this case a mixture of 232 parts by weight of Bz-tetra-aza-copper phthalocyanine and 344 parts by weight of ω-chloro-N-methyl phthalimide into 800 parts by volume of approximately 90% commercial formic acid. After a few hours, a voluminous paste is formed which, after stirring at room temperature for 24 hours, dissolves completely with a blue colour. This solution, appropriately diluted, may then be used directly as a dyebath.

(d) 2 parts by weight of the water-soluble dyestuff obtained according to (a) are dissolved in 2000 parts by weight of water at 50° C. 100 parts by weight of skein yarn of regenerated cellulose fibre are treated in this dyebath at a raising temperature for 30 minutes and at 90° C. for a further 15 minutes. The yarn is then rinsed cold and after-soaped with a solution of 5 g./litre of Marseille soap at 90° C. for 30 minutes. The yarn is then dyed a blue shade. By the same process a blue dyeing is likewise obtained on yarn of natural silk.

(e) 2 parts by weight of the water-soluble dyestuff obtained according to (a) are dissolved in 4000 parts by weight of water at 50° C. with the addition of 3 parts by weight of acetic acid (30%). 100 parts by weight of fibre material of polyacrylonitrile or a co-polymer consisting essentially of polyacrylonitrile are introduced into this dyebath and the temperature is brought to 96–98° C. within 30 minutes. The material is dyed at this temperature for 1 to 1½ hours. After rinsing and an after-treatment at 40–60° C. in a soap bath containing 2 g./litre of Marseille soap, the yarn is dryed a blue shade.

(f) A cotton fabric is printed with a printing paste obtainable in the following manner:

3 parts by weight of the water-soluble dyestuff obtainable according to (a) are dissolved in 20 parts by weight of water and stirred into 50 parts by weight of wheat starch-tragacanth thickener and made up with 27 parts by weight of water to 100 parts by weight of printing paste. After the usual preliminary drying at 60° C., the dyestuff is fixed on the fibre by neutral or acid steaming in the Mather-Platt ager for 5–10 minutes. After the usual after-treatment, a brilliant clear blue print of very good fastness properties is obtained.

Example 6

(a) Into 2000 parts by volume of approximately 90% commercial formic acid there are introduced with stirring 232 parts by weight of Bz-tetra-aza-copper phthalocyanine and 172 parts by weight of ω-chloro-N-methyl phthalimide. After a few hours, a voluminous paste is formed which, after stirring for 24 hours, completely dissolves with a blue colour. The reaction mixture is worked up according to the instructions of Example 5(a). The yield is 200 parts by weight. The dyestuff has the same properties as the dyestuff obtained according to Example 5(a). It showed the following analysis:

C, 46.84%
H, 3.51%
O, 10.28%
N, 20.90%
Cl, 9.70%
Cu, 8.70%

(b) A cotton fabric is impregnated on the foulard at 25° C. with an aqueous solution of 20 parts by weight of the water-soluble dyestuff in 1000 parts by weight of water, squeezed and dried at 60–70° C. Subsequently, the fabric is steamed neutral at 110° C. for 5 minutes and then strongly after-soaped. It is dyed in a blue shade.

Example 7

Into 200 parts by volume of approximately 90% commercial formic acid there are introduced with stirring 23 parts by weight of Bz-tetra-aza-nickel-phthalocyanine and 34.4 parts by weight of ω-chloro-N-methyl phthalimide. After stirring for 24 hours, the blue solution is stirred into 500 parts by volume of ether or acetone, the completely separated dyestuff is filtered off with suction, washed with ether or acetone and dried. The yield is 32 parts by weight. The dyestuff shows the same properties as the dyestuff obtainable according to Example 5(a) and can also be applied according to the dyeing processes described in that example.

Example 8

(a) Into 1000 parts by volume of approximately 90% commercial formic acid there are introduced 116 parts by weight of Bz-tetra-aza-copper phthalocyanine and 118 parts by weight of ω-chloro-N-methyl-succinimide and the mixture is heated with stirring to 100° C. for 1 hour. After cooling, the blue solution thus obtained is stirred into 2500 parts by volume of ether or acetone, the seprated dyestuff is filtered off with suction, washed with ether or acetone and dried.

(b) A cotton fabric is impregnated on the foulard at 25° C. with an aqueous solution of 10 parts by weight of the water-soluble dyestuff in 1000 parts by weight of water, squeezed and dried at 60–70° C. The fabric is then boiled with a solution of 10 cc./litre of sodium hydroxide (38° Bé.) for 15 minutes and strongly after-soaped; it is then dyed in a blue shade.

The yield is 145 parts by weight. The dyestuff shows the same properties as that obtainable according to Example 5(a) and showed the following analysis:

C, 44.07%
H, 3.92%
O, 12.90%
N, 20.70%
Cl, 10.00%
Cu, 8.50%

If instead of 118 parts by weight, only 59 parts by weight of ω-chloro-N-methyl-succinimide are used, a very similar water-soluble dyestuff is obtained.

Example 9

Into a mixture consisting of 30 parts by weight of malonic acid and 20 parts by weight of glacial acetic acid there are introduced with stirring at 80° C. 6 parts by weight of Bz-tetra-aza-copper phthalocyanine and 8 parts by weight of ω-chloro-N-methyl phthalimide. After stirring at 80° C. for an hour, the green solution is stirred into acetone and the green dyestuff filtered off with suction and washed with hot dioxan and ether. A green powder is thus obtained which dissolves in water with a blue colour. The yield is 9 parts by weight. The dyestuff shows the same properties as that obtainable according to Example 5(a) and can also be applied according to the dyeing process described in that example.

Example 10

Into 100 parts by volume of approximately 90% commercial formic acid there are introduced 10.32 parts by weight of metal-free Bz-tetra-aza-phthalocyanine, obtainable by known methods from pyridine-2,3-dicarboxylic acid dinitrile, and 15.64 parts by weight of ω-chloro-N-methyl-phthalimide, and the mixture is stirred at room temperature for 24 hours. After cooling, the blue solution thus obtained is stirred into 500 parts by volume of ether or acetone. The separated blue dyestuff is washed with ether or acetone and dried. The yield is 14.7 parts by weight. The dyestuff dissolves in water with a blue colour and shows the properties described in Example 5(a) and can be applied according to the dyeing process described in that example.

Example 11

Into 200 parts by volume of approximately 90% commercial formic acid there are introduced at 0° C. 5.8 parts by weight of Bz-tetra-aza-cobalt phthalocyanine and 7.89 parts by weight of ω-chloromethyl phthalimide, and the mixture is stirred at this temperature for 24 hours. The blue solution is then stirred into 500 parts by volume of ether or acetone, the separated blue dyestuff is filtered off with suction, washed with ether or acetone and dried at room temperature. The yield is 6.5 parts by weight. The dyestuff dissolves in water with a blue colour.

Example 12

(a) Into 300 parts by volume of approximately 90% commercial formic acid there are introduced with stirring 34.8 parts by weight of Bz-triaza-copper phthalocyanine (obtainable from 3 mols of quinolinic acid and 1 mol of phthalic acid) and 36 parts by weight of ω-chloromethyl phthalimide. After stirring for 24 hours, the blue solution is stirred into 750 parts by volume of ether or acetone, a bluish green precipitate being thus formed which is filtered off with suction, washed with ether or acetone and dried. A bluish green powder is thus obtained which dissolves in water with a blue colour. Yield: 48 parts by weight.

(b) 3 parts by weight of the water-soluble dyestuff are dissolved in 2000 parts by weight of water of 50° C. 100 parts by weight of cotton skein yarn are treated in this dyebath at a raising temperature for 30 minutes and at 90–100° C. for a further 15 minutes. The dyebath is then practically completely exhausted. The yarn is then rinsed and after-treated with a solution of 5–10 parts by weight of sodium carbonate in 2000 parts by weight of water at 100° C. for 15 minutes. Finally, the yarn is strongly after-soaped. It is then dyed in a blue shade.

Example 13

Into 200 parts by volume of approximately 90% commercial formic acid there are introduced with stirring 27 parts by weight of a Bz-triaza-copper phthalocyanine (obtainable from 3 mols of quinolinic acid and 1 mol of 4,5-dimethyl-phthalic acid), and 26.1 parts by weight of ω-chloro-N-methyl phthalimide. After stirring for 24 hours, the blue solution is stirred into 600 parts by volume of ether or acetone, a bluish green precipitate being formed which is filtered off with suction, washed with ether or acetone and dried. A bluish green powder is thus obtained which dissolves in water with a blue colour. Yield: 34 parts by weight.

The dyestuff may be applied in the manner described in Example 12(b). Blue dyeings are thus obtained.

*Example 14*

When using in the working method described in Example 13, 26 parts by weight of a Bz-triaza-copper phthalocyanine obtained, from 3 mols of quinolinic acid and 1 mol of 4-phenyl phthalic acid, instead of from the compounds there indicated, and 23.5 parts by weight of ω-chloro-N-methyl phthalimide, 35 parts of a water-soluble greenish blue dyestuff are obtained.

The dyestuff may be applied in the same manner as described in Example 12(b). Greenish blue dyeings are thus obtained.

*Example 15*

If in the working method described in Example 13 there are used instead of the compounds there indicated, 27 parts by weight of a dyestuff obtainable from 3 mols of 1-amino-3-imino-4(7)-aza-iso-indolenine and 1 mol of 2-amino-5-imino-3,4-dimethyl-pyrrolenine, and 28.5 parts by weight of ω-chloro-N-methyl phthalimide, 33 parts by weight of a water-soluble navy blue dyestuff are obtained.

The dyestuff can be applied in the same manner as described in Example 12(b). Navy blue dyeings are thus obtained.

We claim:

1. Process for the manufacture of dyestuffs which comprises reacting water-insoluble tetra-aza-porphines containing aromatic groupings with tertiary amino groups, with ω-halo-N-methylimides of dicarboxylic acids in the presence of organic acids.

2. Process for the manufacture of dyestuffs which comprises reacting 1 mol of water-insoluble tetra-aza-porphines containing aromatic groupings with tertiary amino groups with at least 2 mols of ω-halo-N-methylimides of dicarboxylic acids in the presence of organic acids.

3. Process for the manufacture of dyestuffs which comprises reacting water-insoluble tetra-aza-porphines containing aromatic groupings with tertiary amino groups at a temperature between 0 and 100° C. with ω-halo-N-methylimides of dicarboxylic acids in the presence of organic acids.

4. Process for the manufacture of dyestuffs which comprises reacting 1 mol of water-insoluble tetra-aza-porphines containing aromatic groupings with tertiary amino groups with at least 2 mols of ω-halo-N-methylimides of dicarboxylic acids in the presence of organic acids at a temperature between 0 and 100° C.

5. Process for the manufacture of a dyestuff which comprises reacting tetra-(ω-N-methyl-N-hydroxymethyl-(aminomethyl) - copper - phthalocyanine with ω-chlormethylphthalimide in the presence of organic acids and recovering the dyestuff formed.

6. Process for the manufacture of a dyestuff which comprises reacting 3,3′,3″,3‴-tetra-aza-copper -phthalocyanine with ω-chlormethylphthalimide in the presence of organic acids and recovering the dyestuff formed.

7. A dyestuff obtained according to claim 1.

8. In the process for dyeing and printing of textile materials the improvement which comprises applying to the textile material as dyestuff the dyestuffs of claim 1, whereby the dyeings and prints are subjected to a heat treatment.

9. Process as claimed in claim 8 which comprises carrying out the heat treatment in the presence of alkalies.

10. Decorated textile materials obtained according to claim 8.

References Cited in the file of this patent

UNITED STATES PATENTS

| | | |
|---|---|---|
| 2,683,643 | Baumann | July 13, 1954 |
| 2,823,205 | Lacey | Feb. 11, 1958 |